(12) United States Patent
Narushima

(10) Patent No.: US 6,354,684 B1
(45) Date of Patent: Mar. 12, 2002

(54) PRINTING APPARATUS AND METHOD FOR SUPPRESSING EMISSION OF EXCESS DILUTION LIQUID

(75) Inventor: Toshio Narushima, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 08/796,385

(22) Filed: Feb. 4, 1997

(30) Foreign Application Priority Data

Feb. 13, 1996 (JP) .............................................. 8-025142

(51) Int. Cl.⁷ .......................... B41J 2/195; B41J 2/205; B41J 2/175; B41J 2/17
(52) U.S. Cl. ............................. 347/7; 347/15; 347/85; 347/95
(58) Field of Search ............................. 347/85, 15, 14, 347/7

(56) References Cited

U.S. PATENT DOCUMENTS

| | | | |
|---|---|---|---|
| 4,494,128 A | * | 1/1985 | Vaught .......................... 347/15 |
| 4,597,794 A | * | 7/1986 | Ohta et al. ..................... 106/20 |
| 4,746,935 A | | 5/1988 | Allen .......................... 346/140 |
| 5,128,694 A | * | 7/1992 | Kanayama .................... 347/71 |
| 5,648,801 A | * | 7/1997 | Beardsley et al. ............. 347/15 |
| 5,777,636 A | * | 7/1998 | Naganuma et al. ........... 347/15 |
| 5,823,690 A | * | 10/1998 | Narushima et al. ........... 347/17 |

FOREIGN PATENT DOCUMENTS

| | | |
|---|---|---|
| EP | 0 369 778 A | 5/1990 |
| EP | 0 372 826 A | 6/1990 |
| EP | 0 655 337 A | 5/1995 |
| EP | 655337 | * 5/1995 |

OTHER PUBLICATIONS

Merriam Webster's Collegiate Dictionary, Tenth Edition, 1997, p. 813.*

* cited by examiner

Primary Examiner—Valerie Lund
Assistant Examiner—Michael S Brooke
(74) Attorney, Agent, or Firm—Rader, Fishman & Grauer, PLLC; Ronald P. Kananen, Esq.

(57) ABSTRACT

A printing apparatus having a stop unit 22 which, if the amount of ink emission in a first print head A is set to a value at or below a preset threshold value, such as 002 in terms of a picture printing data signal, and if the amount of ink emission in a second print head B is set to a value higher than the preset threshold value, a discharge of dilution liquid from the first print head A is stopped in keeping with the stop of the ink emission in the first print head A. The stop unit thereby suppresses the discharge of excess dilution liquid to inhibit generation of tone jump or pseudo contour, as well as to improve the picture printing speed and to enable high quality picture printing.

25 Claims, 15 Drawing Sheets

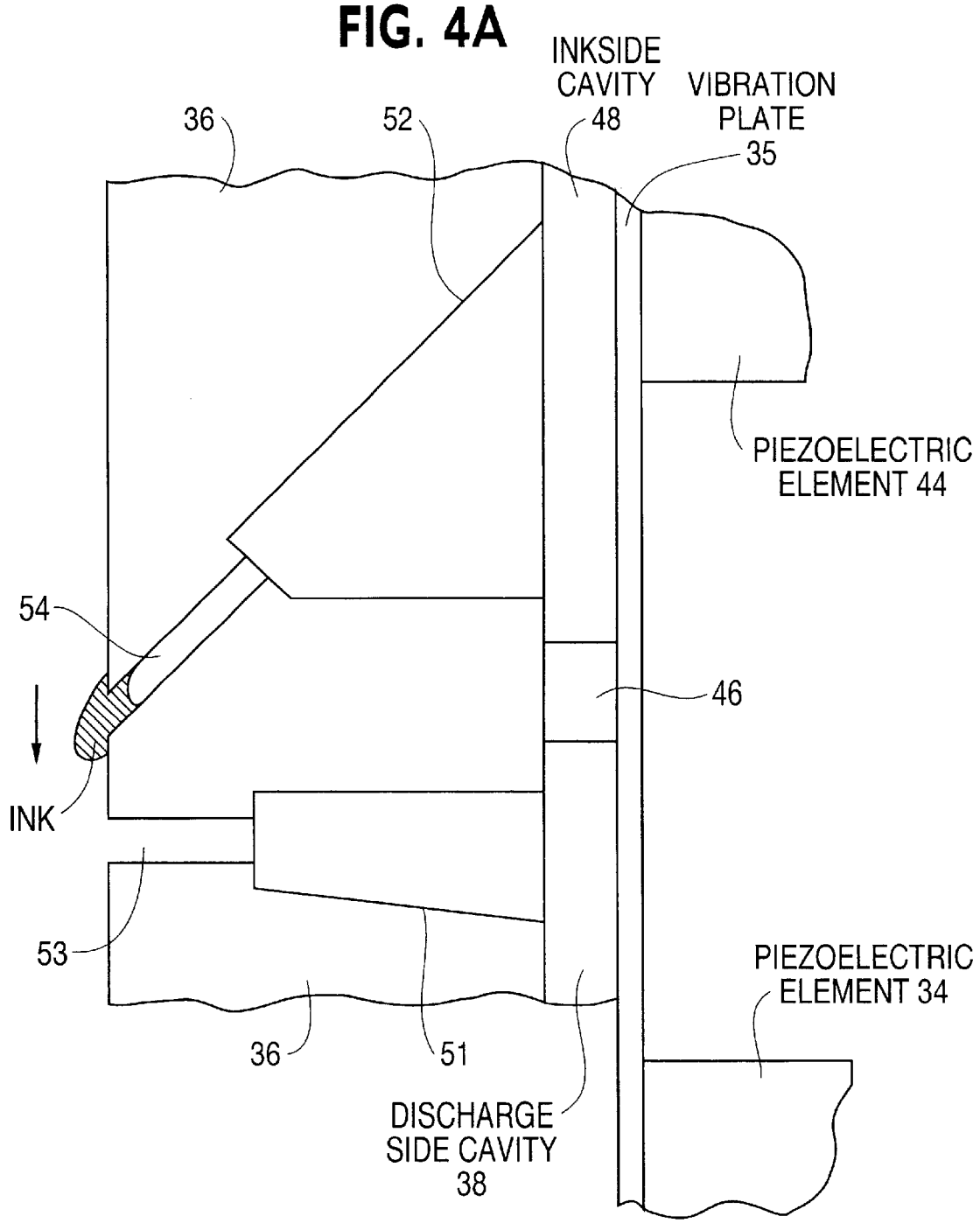

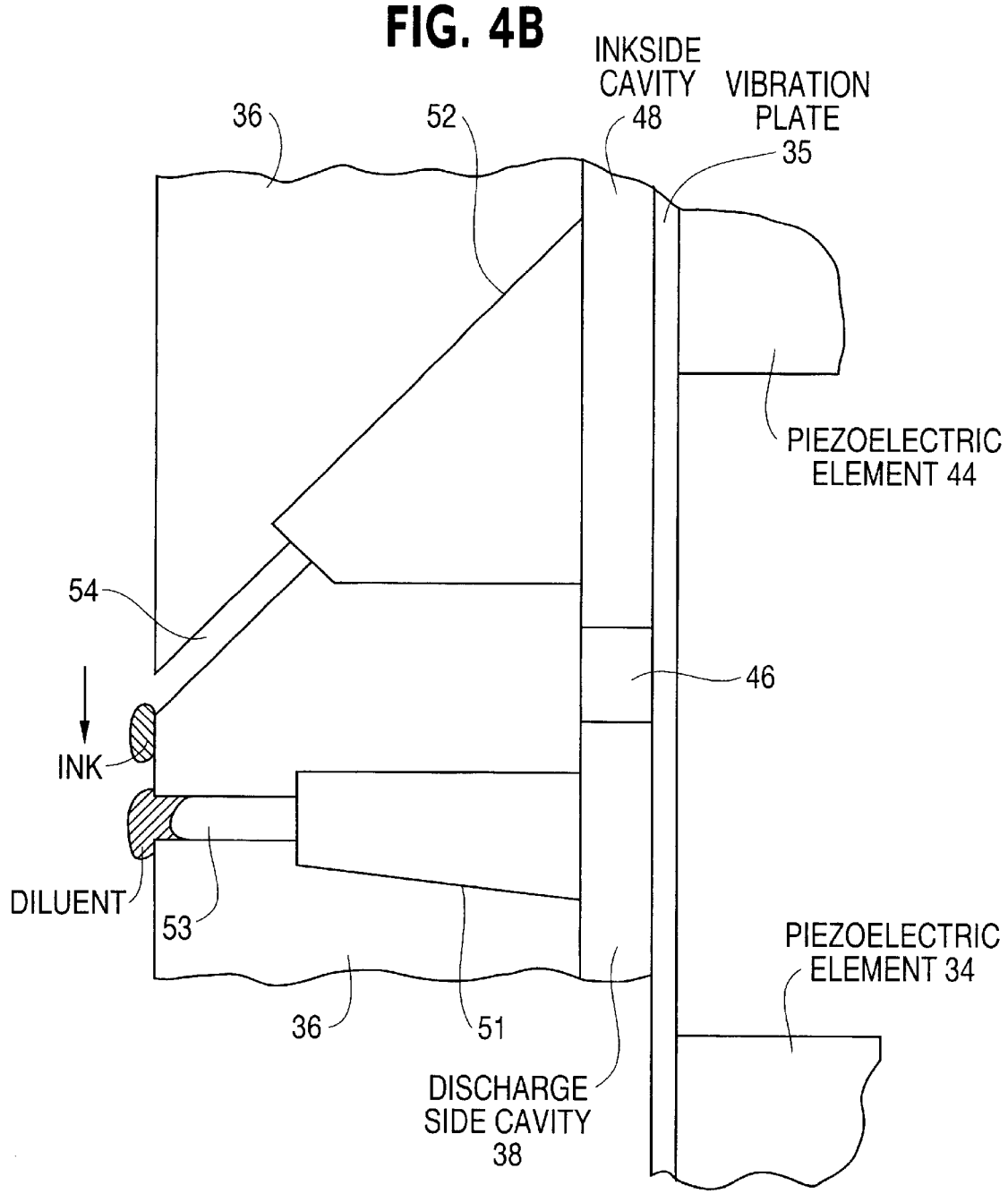

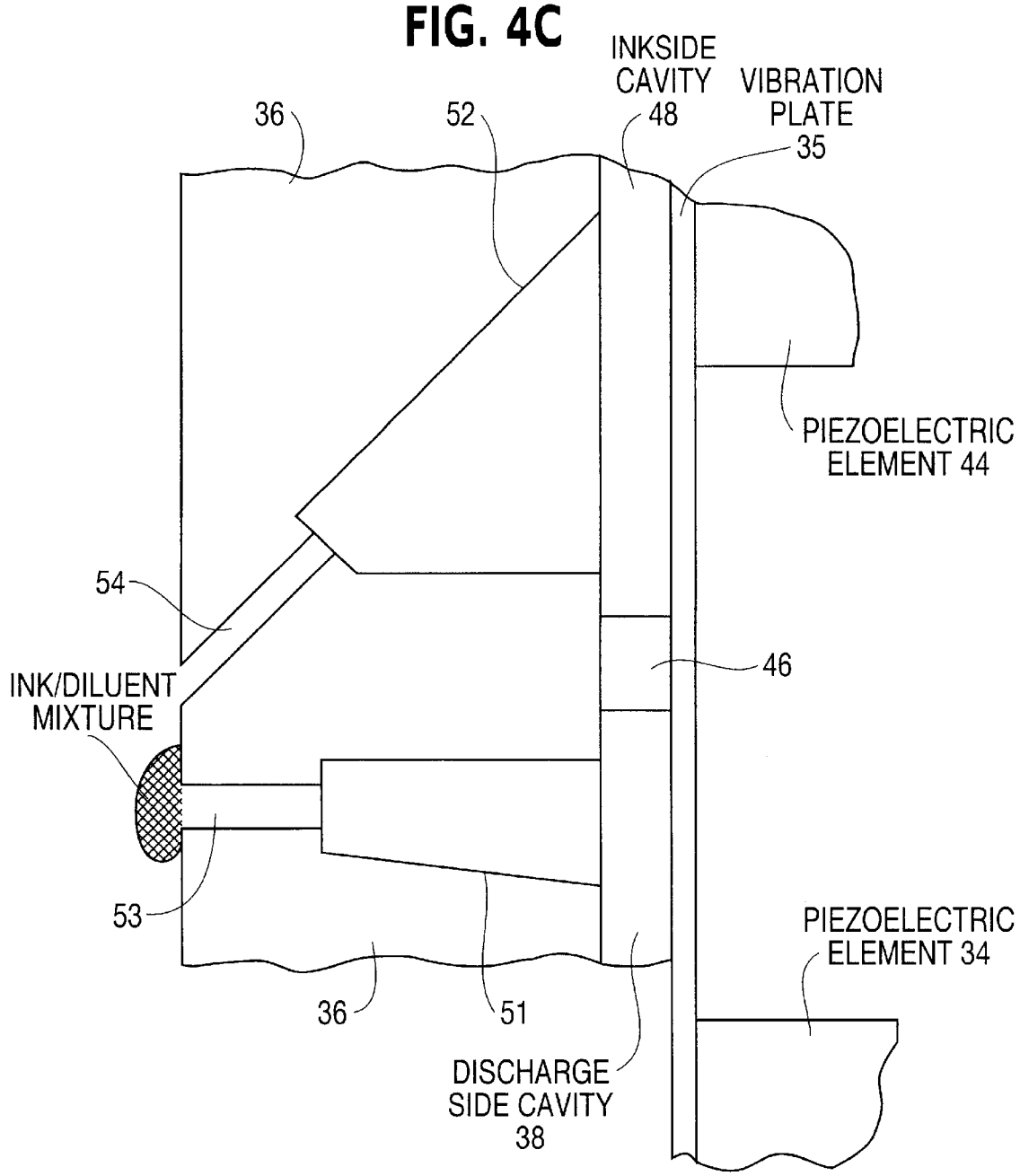

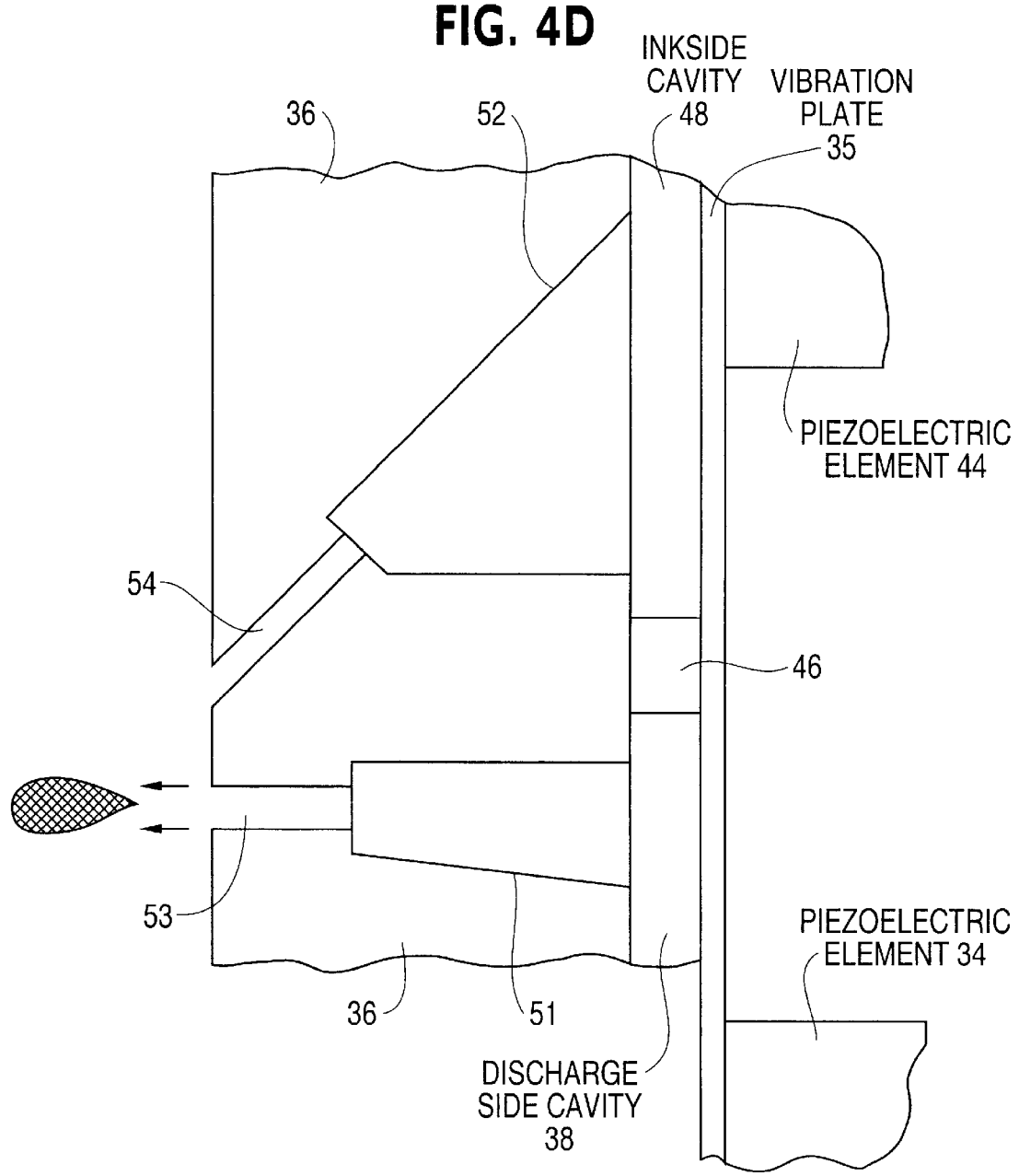

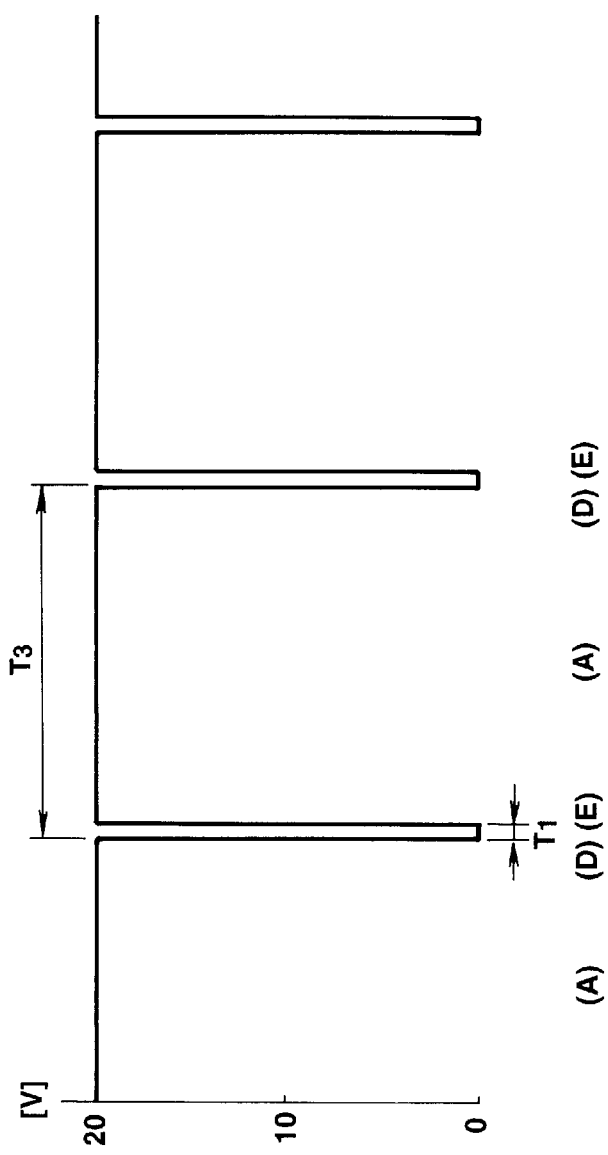
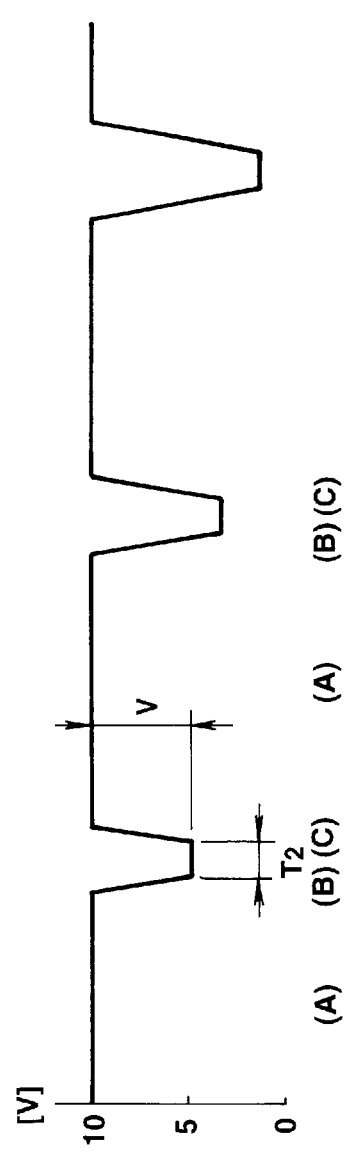
FIG.5A DILUENT DISCHARGE SIDE PIEZO ELEMENT (34)
FIG.5B INK METERING SIDE PIEZO ELEMENT (44)

PRINTING APPARATUS AND METHOD FOR SUPPRESSING EMISSION OF EXCESS DILUTION LIQUID

BACKGROUND OF THE INVENTION

1. Field of the Invention

The present invention relates generally to printing controls and, in particular, to a printing apparatus and method for suppressing emission of excess dilution liquid when a mixing concentration between an ink and a dilution liquid on a recording paper sheet is varied for expressing a half-tone print.

2. Description of the Related Art

A related printing apparatus, a so-called on-demand type ink jet printer, emits an ink droplet responsive to a recording signal for recording signals on a recording medium, such as paper or film. This type of printing apparatus has recently come into widespread use since it can be reduced in size and cost.

In addition, document preparation employing computers (i.e., desk-top publishing) has increased dramatically in recent years, particularly in office environments. Recently, the demand has increased for devices that can output not only a letter or a figure, but also a natural picture, such as a photograph, along with a letter or figure. For printing a natural picture of high picture quality, regeneration of a printing half-tone is crucial.

An ink jet print head used in an on-demand type ink jet printer, referred to hereinafter as a print head, employs a piezoelectric vibrator, such as a piezo-element, or a heating element for emitting an ink droplet. A print head utilizing displacement of a piezoelectric vibrator, such as a piezo-element, emits an ink droplet as a medium for deposition by deforming the piezo-element for pressurizing the ink.

A print head that utilizes displacement of a piezoelectric vibrator can use the so-called multiple concentration ink mixing type ink dot concentration modulation method (in-ink-dot concentration modulation method) for producing a desired half-tone print.

This in-ink-dot concentration modulation method is a technique for metering the concentration of the emitted ink liquid droplet. Specifically, the voltage level applied to the piezoelectric vibrator is varied responsive to the variation in the impressed voltage level for varying the volume of the ink liquid droplet to be mixed responsive to the displacement of the piezoelectric vibrator for producing the desired half-tone print.

For the ink liquid droplet, a mixed liquid of an ink of high concentration and a diluted ink liquid is used. For mixing the ink liquid droplets, a method is provided for mixing the ink of high concentration and the diluted ink liquid, which are metered in an ink head responsive to the displacement of a piezoelectric vibrator. The mixing occurs prior to emitting the ink liquid droplet via a nozzle. Alternatively, a method is provided for separately emitting the ink of high concentration and the diluted ink liquid, which are metered in an ink head responsive to the displacement of the piezoelectric vibrator. In this method, the mixing occurs at the time of emitting the ink liquid droplet, with the ink and the diluted ink liquid being mixed together during flight or upon deposition on the recording paper sheet for forming a single ink dot.

For regenerating the half-tone in the above-described on-demand type ink jet printer, there is a method of forming a pixel using a matrix of 4×4 dots, and expressing the gradation using a so-called dither method on the matrix basis.

The amount of ink of various colors is metered on the basis of the picture printing data signals produced using this dither method. The ink liquid droplets comprising a mixed liquid of the respective ink liquids and the diluted ink liquids are emitted from the print heads associated with the inks of various colors.

The picture printing data signals are 8-bit signals of, for example, 000 to 255, in which 000 and 255 correspond to the stop of the ink emission and the maximum amount of the emitted ink (i.e., the highest ink concentration), respectively.

The ink used is in the form of a combination of C (cyan), M (magenta), and Y (yellow) or C (cyan), M (magenta), Y (yellow), and K (black).

With the above-described on-demand type ink jet printer, if the picture printing data signal for a print head is 000 for a given print head and is not 000 for another print head, ink emission from the print head with the picture printing data signal of 000 is stopped, while the diluted ink liquid from the same print head is continued.

At this time, the total amount of the ink dilution liquids emitted from the respective print heads becomes superfluous, such that the ink liquid droplet can hardly be dried, and bleeding or flow of the ink liquid droplet is liable to be produced. The result is a suppressed picture printing speed and waste of the dilution liquid.

Thus, it has been proposed to stop the emission of the ink and the dilution liquid in all of the print heads, if the picture printing signal for a given print head is 000, irrespective of whether or not the picture printing signal for another print head is 000.

However, since no ink liquid droplet is emitted to the respective pixels of a totally white area on a recording medium, the picture printing concentration in the vicinity of the area is changed acutely to produce tone jump and a so-called pseudo-contour in the vicinity of the area. Although the tone jump or the pseudo-contour raises no problem as long as they are not outstanding, they can affect the picture quality significantly.

SUMMARY OF THE INVENTION

In view of the above-described problems in the related art, it is an object of the present invention to provide a printing apparatus in which emission of a superfluous dilution liquid is suppressed for suppressing tone jump or generation of a pseudo-contour for improving the picture printing speed and realizing high quality picture printing.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In order to solve the above-described problems, a printing apparatus according to the present invention comprises: a plurality of print heads for printing a plurality of respective colors based on a printing data, the print heads each having a means for discharging an ink and a dilution liquid at varying concentrations based on the printing data; and a stop means for stopping a discharge of the dilution liquid from a first one of the print heads when the printing data corresponding to a dot to be printed by the first print head is below a preset threshold value, while permitting a discharge of dilution liquid from a second one of the print heads whose printing data corresponding to the dot is above the preset threshold value.

According to a second aspect of the present invention, a printing apparatus is provided which comprises: a plurality of print heads for receiving a printing data and discharging an ink and a dilution liquid; and a stop means for detecting a printing data to be inputted into the plurality of print heads for a dot to be printed, and for stopping a discharge of the ink and dilution liquid from at least one print head whose printing data corresponding to the dot to be printed is below a predetermined threshold value, while permitting a discharge of the ink and dilution liquid from another print head whose printing data corresponding to the dot to be printed is above the predetermined threshold value.

According to a third aspect of the present invention, a method of driving a printing apparatus having a plurality of print heads for printing a plurality of respective colors based on a printing data is provided. The print heads each have a means for discharging an ink and a dilution liquid at varying concentrations based on the printing data. The method is characterized by the steps of: receiving printing data which determines an ink concentration for a dot to be printed; comparing the printing data to a preset threshold value; stopping a discharge of dilution liquid from a first one of the print heads whose printing data corresponding to the dot to be printed is at or below the preset threshold value; and discharging dilution liquid from a second one of the print heads whose printing data corresponding to the dot to be printed is greater than the preset threshold value.

According to a fourth aspect of the present invention, a method of driving a printing apparatus having a plurality of print heads for mixing an ink and a dilution liquid and for varying an ink concentration within a dot to be printed on a printing medium is provided. The method is characterized by the steps of: receiving a printing data which determines an ink concentration; comparing the printing data to a predetermined threshold value; stopping a discharge of the ink and dilution liquid from at least one of the print heads whose printing data corresponding to a dot to be printed is at or below the predetermined threshold value; and discharging the ink and dilution liquid from at least another one of the print heads whose printing data corresponding to the tot to be printed is greater than the predetermined threshold value.

As described above, the present invention uses, as the medium for deposition, a liquid mixture comprising an ink metered responsive to the picture printing data signal and a dilution liquid for the ink.

The printing apparatus of the present invention is made up of a plurality of print heads in association with the inks of various colors for emitting the associated media for deposition. The printing apparatus is characterized by a stop means for stopping the emission of the dilution liquid when the printing picture signal falls below a preset threshold value. Specifically, the stop means operates so that, if the picture printing data signal sets the amount of ink emission in one or more of the print heads to a value not larger than a preset threshold value while setting the amount of ink emission in another print head to a value larger than the threshold value, the emission of the dilution liquid is stopped along with the emission of ink in the one or more print heads.

If the amount of ink emission in a given print head is set to a value smaller than the threshold value, the ink concentration is extremely low such that, on visual inspection, no definite picture printing concentration is achieved. Therefore, if a dilution liquid is emitted from the print head at this time, the dilution liquid would be superfluous.

Thus, with the printing apparatus of the present invention, if the amount of ink emission from one or more print heads is set to a value smaller than the threshold value, while the amount of ink emission in another print head is set to a value larger than the threshold value, emission of the superfluous dilution liquid is suppressed in the one or more print heads. Therefore, it becomes possible to prevent bleeding or flow of the medium for deposition on the recording medium, as well as to accelerate drying of the medium for deposition.

In the present invention, it is desirable to prepare the printing picture data signal using a multigradation error diffusion method.

BRIEF DESCRIPTION OF THE DRAWINGS

The present invention will become more clearly appreciated as the disclosure of the invention is made with reference to the accompanying drawings. In the drawings:

FIGS. 5A and 5B are timing charts for illustrating the operation of the two-liquid mixing type print head.

DETAILED DESCRIPTION OF THE PREFERRED EMBODIMENTS

The preferred embodiments of the present invention are hereinafter described in detail with reference to FIGS. 1 to 11 of the accompanying drawings.

The printing apparatus according to the preferred embodiment has an ink jet print head employing a vibrator-inducing electrostriction (a phenomenon in which a dielectric substance placed under an electrical field undergoes deformation and distortion), as shown in FIGS. 1 to 4. This ink jet print head is referred to hereinafter as a print head 21. The desired half-tone print is obtained using a so-called multiple concentration ink mixing type ink dot concentration modulation method (in-ink-dot concentration modulation method).

The multiple concentration ink mixing type ink dot concentration modulation method is a technique for metering the concentration of the emitted ink liquid droplet.

Specifically, the voltage level applied to the piezoelectric vibrator is varied responsive to the variation in the impressed voltage level for varying the volume of the ink liquid droplet to be mixed responsive to the displacement of the electrostriction vibrator for producing the desired half-tone print.

As a method of mixing the ink liquids in the multiple concentration ink mixing type ink dot concentration modulation method, there is a method in which, before emitting the ink liquid droplets from the nozzle, an ink of high concentration and an ink of low concentration (or a transparent solvent) are mixed together in preset constant amounts in the ink head responsive to the displacement of the electrostriction element. Alternatively, there is a method in which, at the time of emission of the ink liquid droplets, the ink of high concentration and the ink of low concentration (or a transparent solvent) are mixed together separately, as they are metered, in preset constant amounts responsive to the displacement of the electrostriction element, with the two inks being mixed together during flight or on deposition on the recording paper sheet for forming a single ink dot.

The materials for the electrostriction vibrator can include piezoelectric ceramics, such as lead titanate zirconate ($PbiO_3$) or barium titanate ($BaTiO_3$), quartz and Rochel salts.

Figure 1:
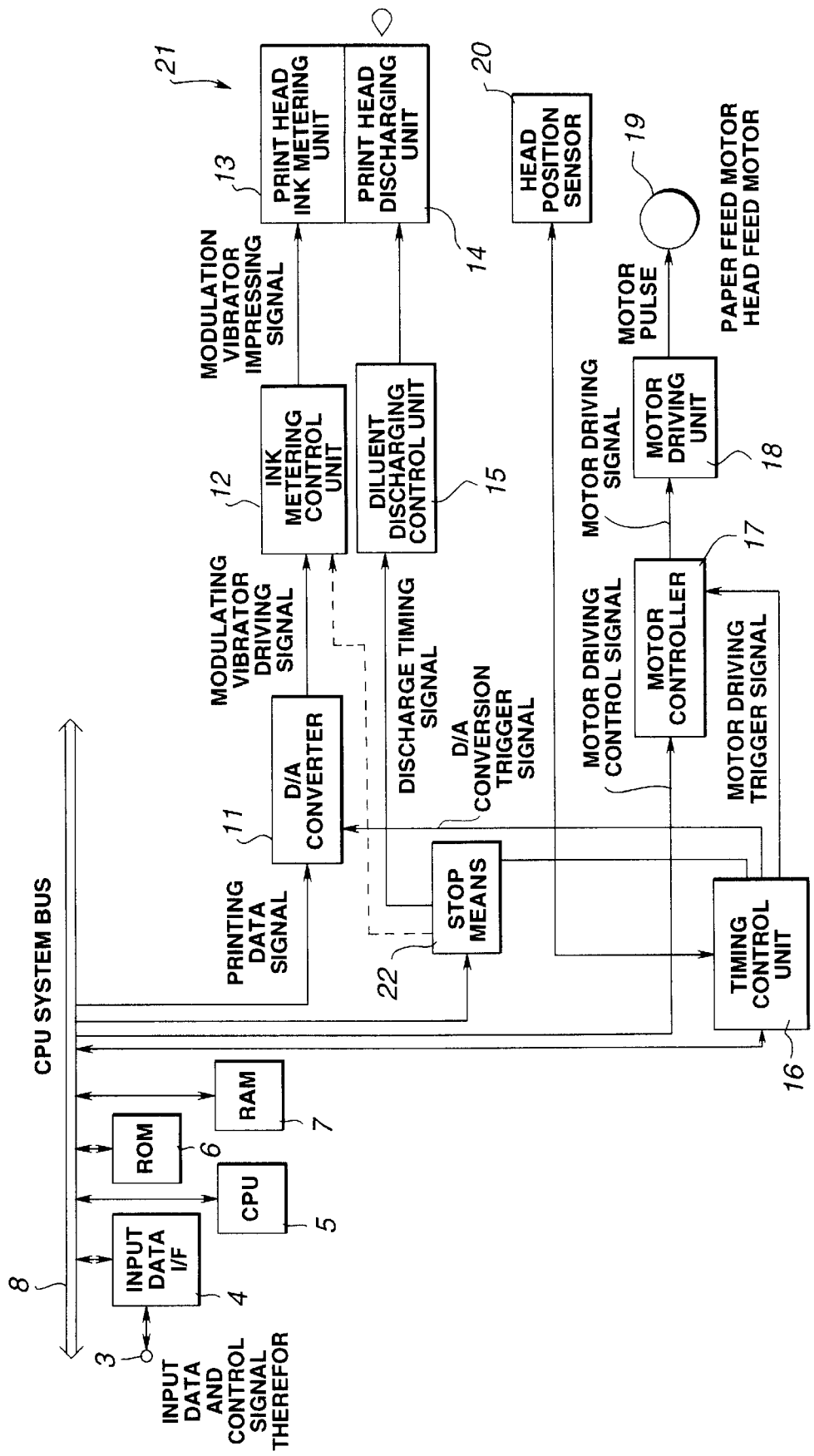
FIG. 1 is a schematic circuit block diagram of a printing apparatus embodying the present invention.

The printing apparatus shown in FIG. 1 uses, as an illustrative example of the multiple concentration ink mixing type ink dot concentration modulation method, a two liquid (ink and dilution liquid) mixing type (carrier jet type) print head.

Figure 2:
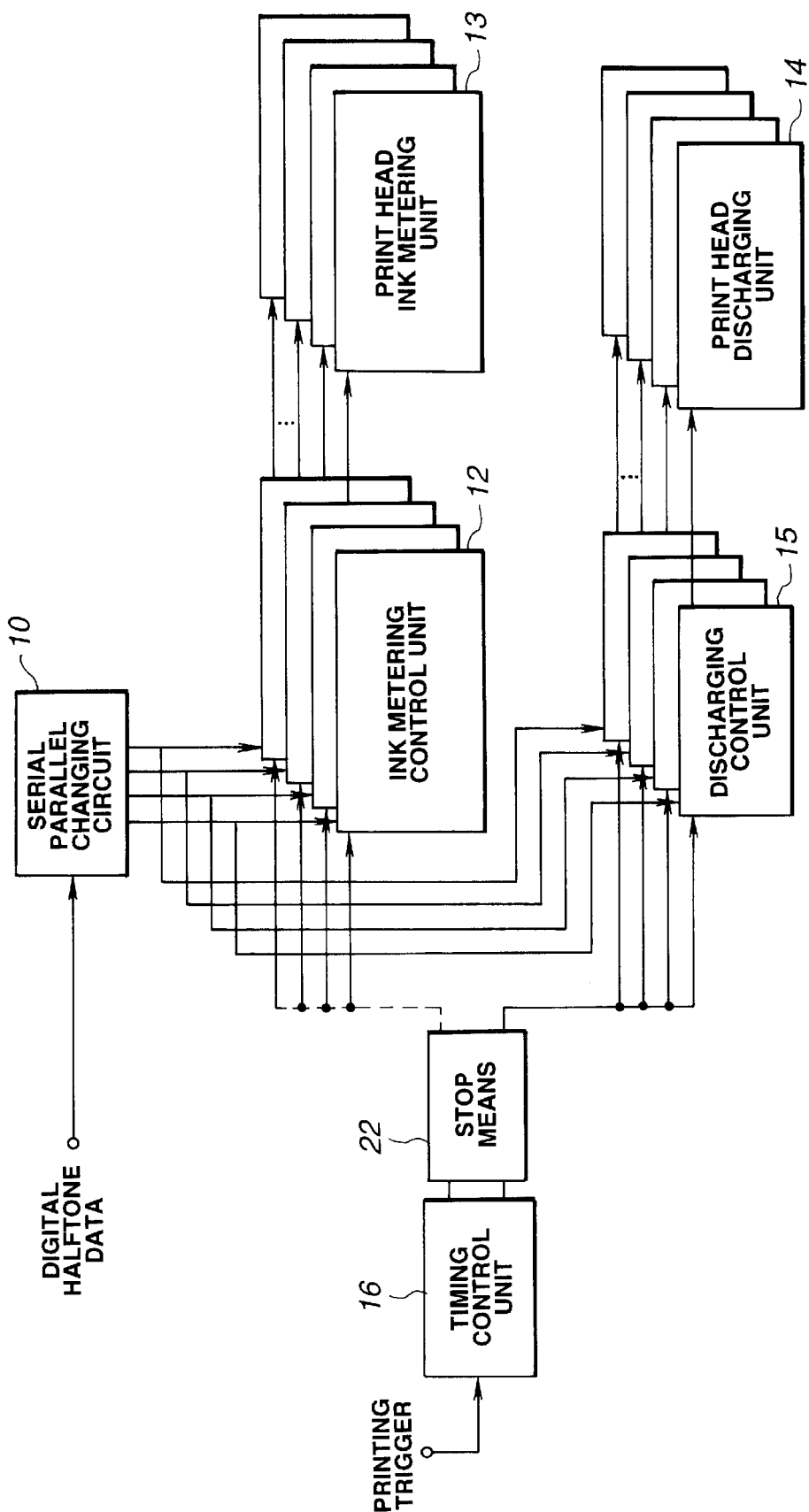
FIG. 2 is a circuit block diagram illustrating a driving circuit for a plurality of print heads of a printing apparatus according to the present invention.

Although the embodiment of FIG. 1 shows a single print head 21, it is understood that the printing apparatus of the present invention has a plurality of print heads 21 associated with respective colors. As shown in FIG. 2, for example, a plurality of ink metering control units 12, print head ink metering units 13, diluent discharging control units 15, and print head diluent discharging units 14 are connected to the stop means 22 and the timing control unit 16. Each set of the units 12, 13, 14, and 15 corresponds to a single print head 21 of the printing apparatus. The plural print heads 21 are associated with the respective colors of C (cyan), M (magenta) and Y (yellow) or C (cyan), M (magenta), Y (yellow) and K (black), and are arrayed in a side-by-side relation to one another.

As shown in FIG. 2, digital half-tone data are supplied to each ink metering control unit 12 and each diluent discharging control unit 15 via a serial parallel changing circuit 10. If the digital half-tone data are less than a specified threshold value, the stop means 22 prevents the ink from being metered and discharged. When the printing time comes, a printing trigger is output to the timing control unit 16, which then outputs at a predetermined timing an ink metering unit control signal and a discharging control signal to each ink metering control unit 12 and each diluent discharging control unit 15. Each signal is output at the timing indicated in FIGS. 5A and 5B, as explained below.

If there are an extremely large number of nozzles (print heads), it is possible to have an IC (integrated circuit) loaded on the print head itself for reducing the number of interconnections for the print head.

Figure 3:
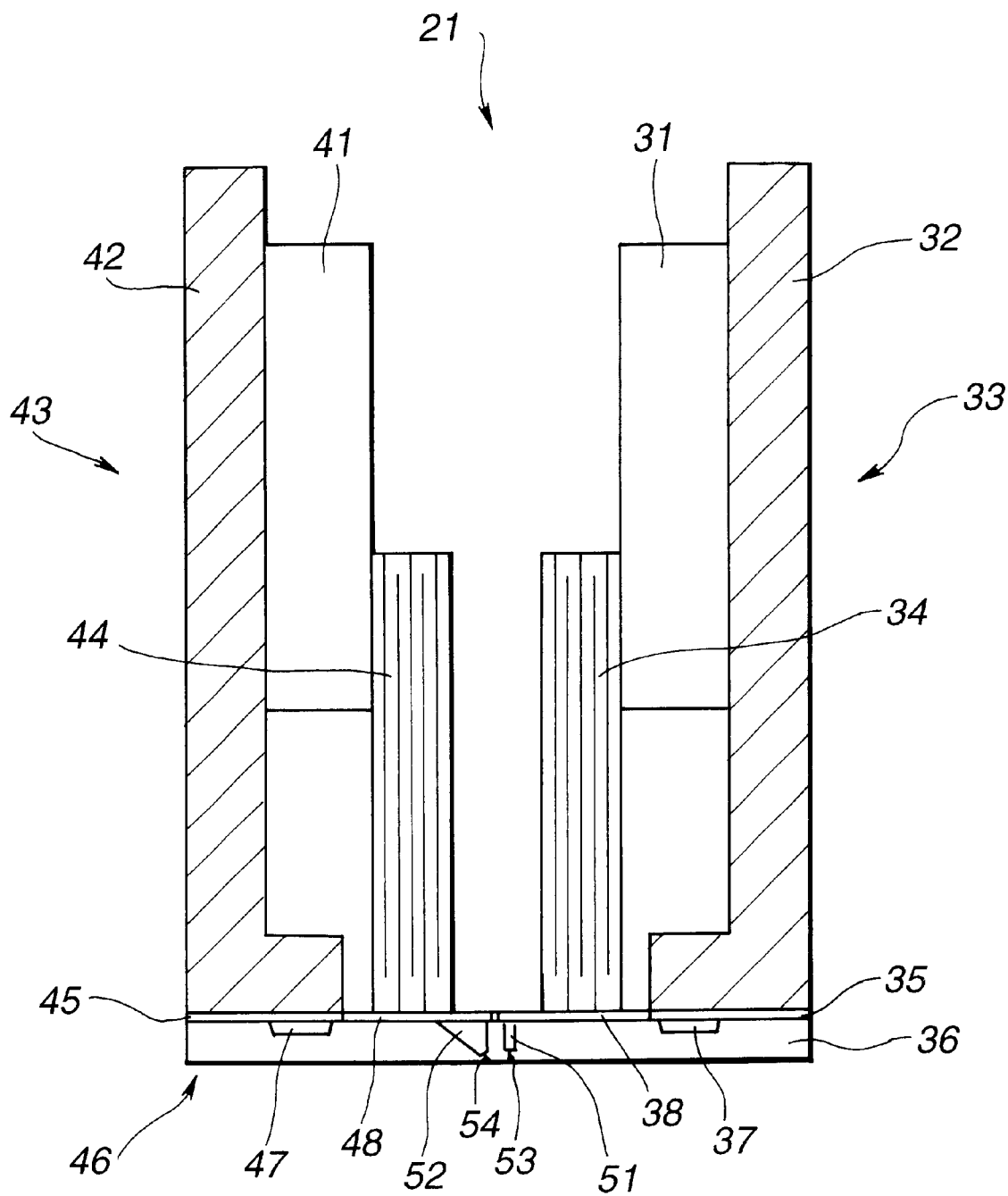
FIG. 3 is an enlarged cross-sectional view of a print head of the two-liquid (ink solution-dilution liquid) mixing type.
Figure 4:
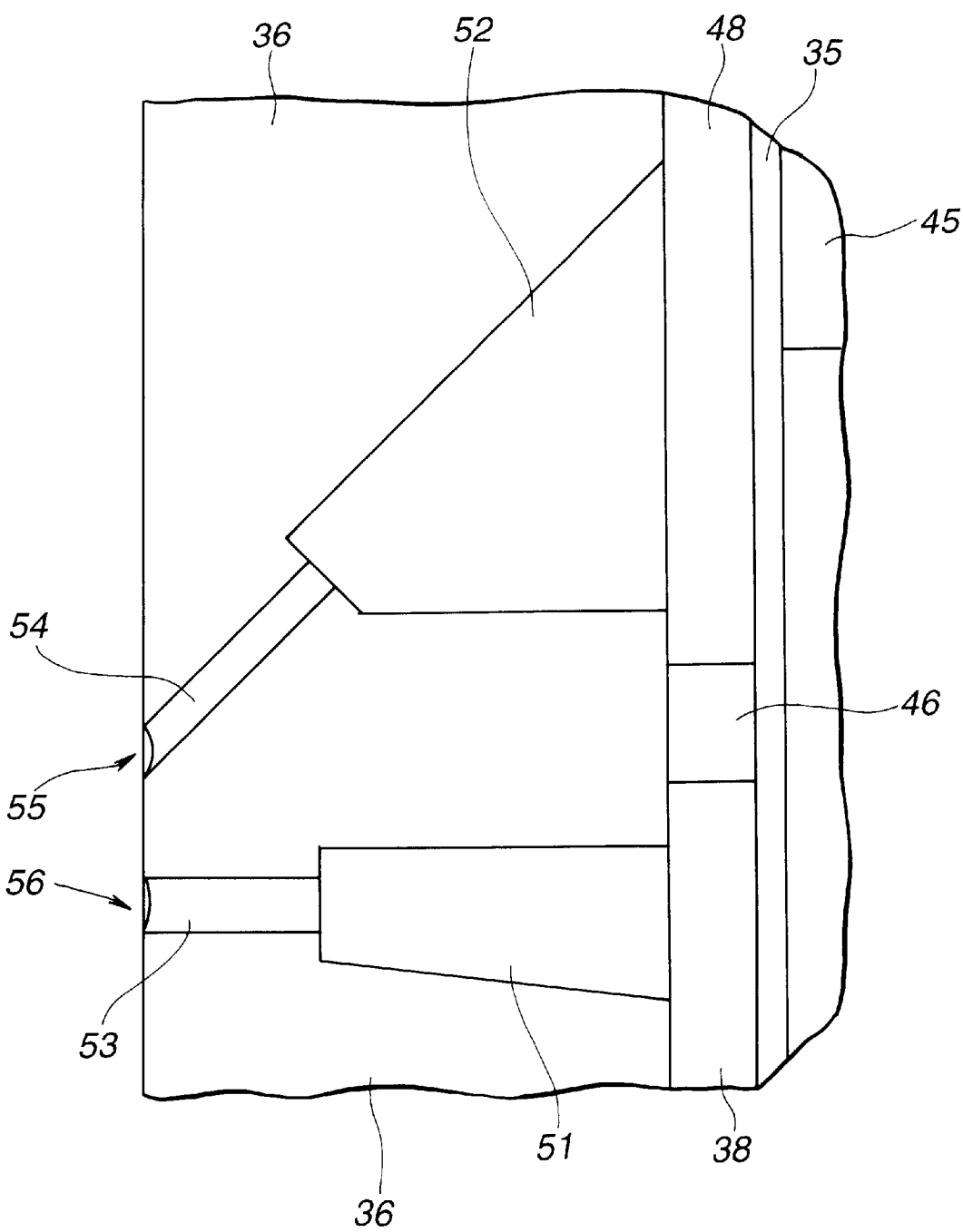
FIG. 4 is an enlarged cross-sectional view showing the vicinity of the nozzles of the print head shown in FIG. 3.

FIGS. 3 and 4 illustrate an example of the print head 21 in which a piezo-element is used as an electrostriction vibrator, and an ink is metered while the dilution liquid is emitted. FIGS. 3 and 4 show the print head in a cross-sectional view, with FIG. 4 showing the vicinity of the nozzles of FIG. 3 in an enlarged view.

The print head 21 shown in FIGS. 3 and 4 includes a cavity unit 46 constituting a diluent discharge side cavity 38 and an ink metering side cavity 48. A diluent discharge side piezo unit 33 and an ink metering side piezo unit 43 are associated with the diluent discharge side cavity 38 and the ink metering side cavity 48, respectively. The cavity unit 46 has a diluent discharge side nozzle 53 in fluid communication with a first introduction port 51, and an ink metering side nozzle 54 in fluid communication with a second introduction port 52.

In addition, the cavity unit 46 includes an orifice plate 36, as shown in FIG. 3, which is provided with first and second supply chambers 37 and 47 with C-shaped cross-sections. The first supply chamber 37 provides a recess for collecting the diluent, and the second supply chamber 47 provides a recess for collecting the ink. The first and second supply chambers 37, 47 are formed such that they have the nozzles 53 and 54 and the introduction ports 51 and 52 between them. The first and second supply chambers 37 and 47 are in fluid communication with the diluent discharge side cavity 38 and the ink metering side cavity 48, respectively. A vibration plate 35 is laminated on the orifice plate 36 to hermetically close the diluent discharge side cavity 38 and the ink metering side cavity 48.

The diluent discharge side piezo unit 33 has a diluent discharge side layered piezoelectric element 34, having layered piezoelectric material and electrically conductive material, a support 31 for securing one end of the layered piezoelectric element 34, and a diluent discharge side holder 32 for securing the layered piezoelectric element 34 and the support 31 to the cavity unit 46. The ink metering side piezo unit 43 has a diluent discharge side layered piezoelectric element 44, having layered piezoelectric material and electrically conductive material, a support 41 for securing one end of the piezoelectric element 44, and an ink metering side holder 42 for securing the layered piezoelectric element 44 and the support 41 to the cavity unit 46.

The opening direction of the ink metering side nozzle 54 is formed at an angle of approximately 45° with respect to the opening direction of the diluent discharge side nozzle 53.

In the print head of FIGS. 3 and 4, the orifice plate 36 is formed by injection molding of resin, such as polysulfone, while a wall of the cavity unit 46 is formed of a photosensitive resin, such as dry film photoresist. The vibration plate 35 is formed by a metal plate, such as a nickel plate. The nozzles 53 and 54 are machined by, for example, an excimer laser.

Timing charts illustrating when a driving voltage is applied are shown in FIGS. 5A and 5B for the case where a printing is performed by the liquid-ejection-type recording device according to the present invention. The laminated piezoelectric elements of a $d_{31}$ mode, for example, are used as the layered piezoelectric elements 34 and 44.

As indicated in FIG. 5A, during a wait before printing, that is, during the time indicated by (A) in FIG. 5A, a voltage of 20 V, for example, is maintained across the layered piezoelectric element 34. As indicated in FIG. 5B, during a wait before printing, that is, during the time indicated by (A) in FIG. 5B, a voltage of 10 V, for example, is maintained across the layered piezoelectric element 44.

Then, when printing, a voltage applied across the layered piezoelectric element 44 is gradually reduced to 5 V, for example, at a time indicated by (B) in FIG. 5B, so as to push and to make the ink ooze from the ink metering side nozzle 54 on the basis of a signal from the above-described ink metering control unit 12. The layered piezoelectric element 44 is held at this condition for 150 μsec, for example. Then, the layered piezoelectric element 44 gradually extends in the direction of the length thereof to make the ink ooze outside of the ink metering side nozzle 54 toward the vicinity of the orifice of the diluent discharge side nozzle 53, and to mix with the diluent of the diluent discharge side nozzle 53.

Next, the voltage of the layered piezoelectric element 44 is gradually returned to 10 V, for example, at a time indicated by (C) in FIG. 5B, so as to introduce the ink into the ink metering side nozzle 54 and to make only the metered ink remain in the vicinity of the orifice of the diluent discharge side nozzle 53. The layered piezoelectric element 44 then gradually contracts in the direction of the length thereof, and the inner pressure of the ink metering side nozzle 54 is released and, thus, the ink will return into the ink metering side nozzle 54. Accordingly, the metered ink remains in the vicinity of the orifice of the diluent discharge side nozzle 53.

Next, the voltage of the layered piezoelectric element 34 is made 0 V, for example, at a time indicated by (D) in FIG. 5A, so as to discharge the diluent from the diluent discharge side nozzle 53. The layered piezoelectric element 34 then extends in the direction of the length thereof and pressurizes the diluent discharge side cavity 38 via the vibration plate 35, thereby increasing the inner pressure of the diluent discharge side nozzle 53. As a result, the diluent is pushed out by the inner pressure of the diluent discharge side nozzle 53 and mixed with the ink remaining in the vicinity of the orifice of the diluent discharge side nozzle 53 to make the mixed solution.

Next, the voltage of the layered piezoelectric element 34 is made 0 V for 50 μsec, for example, from the time indicated by (D) in FIG. 5A and returned to 20 V at the time indicated by (E), for example. The layered piezoelectric element 34 then contracts in the direction of the length thereof, the inner pressure of the diluent discharge side nozzle 53 is released, and the diluent tends to return into the diluent discharge side nozzle 53. This makes a narrow part between the diluent in the diluent discharge side nozzle 53 and the mixed solution. The mixed solution is then discharged from the diluent discharge side nozzle 53 and adheres to the printing paper to perform the printing.

The inner pressure of the diluent discharge and ink metering side cavities 38 and 48 returns to the former state in the course of time. The diluent and the ink are packed again into the first and second nozzles 53 and 54, respectively, to return to the former state.

The diluent discharging pulse length between (D) and (E) indicated by $T_1$ in FIG. 5A, the ink metering pulse length between (B) and (C) indicated by $T_2$ in FIG. 5B, and the ink metering voltage indicated by V in FIG. 5B are all variable.

As shown in FIGS. 5A and 5B, the printing is performed by repeating the above-described operations. The printing cycle indicated by $T_3$ in FIG. 5A may be made 1 μsec, for example.

If the multiple concentration ink mixing type ink dot concentration modulation method alone is not sufficient to reproduce the gradation sufficiently, a gradation reproducing ink dot arraying method, associated with the number of gradations possible with the multiple concentration ink mixing type ink dot concentration modulation method, may be employed in combination with the latter method for enabling sufficient gradation regeneration.

Specifically, the multiple concentration ink mixing type ink dot concentration modulation method is used within a range in which stable gradation regeneration is possible with such method. On the other hand, the method of gradation regeneration by ink dot arraying is used within a range in which gradation regeneration becomes unstable with the concentration modulation method.

That is, the method of gradation regeneration by ink dot arraying is used for a highlighted portion in a picture where stable gradation regeneration is not possible, while the inherent concentration modulation method is used for a half-tone to shadowy portion excluding the highlighted portion.

The construction and operation of the above-described printing apparatus will now be explained with reference to FIGS. 1 and 2. The following sequence of operations is carried out by the CPU 5 in accordance with program data stored in the ROM 6.

For starting the printing of a desired picture, a command for requesting the printing start is entered via a terminal 3 and a data input interfacing unit 4, as shown in FIG. 1. This printing start request command signal is sent via the CPU system bus 8 to the CPU 5 (or DSP).

The CPU 5 controls various signal processing and various parts based on the program data stored in the ROM 6. The data input interfacing unit 4 is fed with picture data for printing as input data from the host computer, while the above printing start request command signal from the host computer is supplied from the host computer to the data input interfacing unit 4.

In the printing state, as set by entrance of the printing start request signal, the printing apparatus returns to the computer, via the data input interfacing unit 4, a control signal signifying that the picture data for printing can be accepted as an input data control signal for bidirectional communication with the host computer.

The host computer, when accepting the control signal, sends the picture data for printing to the printing apparatus.

In the printing apparatus, the picture data, accepted via the input terminal 3 and the data input interfacing unit 4, is sent to and stored in the RAM 7 over the CPU system bus 8. At this time, the data input interfacing unit 4 controls the entrance of the picture data for avoiding overflow of the RAM 7.

That is, at a time point when the picture data has been stored in the total storage area for the picture data in the RAM 7, the CPU 5 outputs a control signal requesting the cessation of entrance of the picture data to the host computer via the data input interfacing unit 4.

The picture data is then replaced by picture data by, for example, the multiple gradation error diffusion method. The gradations and the voltage level applied across the electrostriction vibrator are determined on the basis of the instability factors in displacement of the electrostriction vibrator (such as hysteresis characteristics and variations in the impressed voltage due to variations in head assembling), instability factors of the emission of the entire head (errors in the emission characteristics due to fluctuations in head assembling or variations in emission characteristics due to characteristics of the vibration plate), or changes in the concentration of the ink dot formed on the recording paper sheet.

If a number of the picture data, generated as described above, equal to the number of the driven print heads 21, are stored on the RAM 7, the CPU 5 reads out the picture data stored in the RAM 7 and sends the data as a picture printing data signal to the D/A converter 11.

The picture printing data signal is, for example, an 8-bit signal from 000 to 255, in which 000 and 255 correspond to the stop of the ink emission (i.e., the lowest concentration)

and the maximum amount of the emitted ink (i.e., the highest concentration), respectively.

Specifically, if the above print heads associated with respective colors of C (cyan), M (magenta), Y (yellow) and K (black) are provided, and if the 8-bit picture printing data signals are supplied to the respective print heads, the manner in which the picture printing signals of the respective colors are generated can be explained as follows.

First, the reflected light from the surface of an original forms an image on a CCD image sensor and thereby is photoelectrically converted for generating 8-bit electrical signals indicating R (red), G (green), and B (blue) signals.

These electrical signals are processed by color separation for generating 8-bit electrical signals respectively specifying C, M and Y. Subsequently, the electrical signals are processed with black extraction and removal of underground color for generating 8-bit electrical signals specifying C, M, Y and K. These electrical signals are processed with color correction, gradation correction, and sharpness correction. Moreover, the electrical signals are processed with the multiple gradation error diffusion method so that the number of bits from the multiple gradation error diffusion method is summed to the 8 effective bits for generating picture printing signals of the 256-gradation (000 to 256) specifying C, M, Y and K.

The number of the driven print heads at the time of storing the picture printing data on the RAM 7 is the number for one scan of each print head in the case of a so-called head driving printer, which drives four (C, M, Y and K) print heads for effecting printing.

In the case of a line head type printer having a print head having a number of nozzles equal to the number of recording picture sizes, the above number corresponds to one line. The head driving type printer and the line head type printer will be explained in detail below.

The CPU 5 sends the printing picture data stored in the RAM 7 to the D/A converter 11, at the same time as it sends a motor driving control signal to the motor controller 17. The motor controller 17 generates a motor driving signal based on the motor driving control signal and sends the motor driving signal to the motor driving unit 18.

The motor driving unit 18 converts the motor driving signal into a motor pulse of a voltage and a current capable of driving the motor unit 19 made up of a paper feed motor and a head feed motor, and sends the motor pulse to the motor unit 19. If the printer is the head driving type printer, the head feed motor will then be operated.

When the head feed motor is started, and a head position detection sensor 20 has detected that the nozzle of the print head 21 has reached the printing position on the recording sheet, the timing control unit 16 outputs a D/A conversion trigger signal to the D/A converter 11 based on the detection signal from the head position detection sensor 20. Simultaneously, the timing control unit 16 outputs a motor driving trigger signal to the motor controller 19.

The CPU 5 recognizes the state of the timing control unit 16 and sends the picture printing data signal stored in the RAM 7 to the D/A converter 11 when the D/A conversion trigger signal from the timing control unit 16 is supplied to the D/A converter 11. The D/A converter 11 is responsive to the D/A conversion trigger signal to generate a modulated vibrator driving signal, which is input to the ink metering control unit 12.

This modulated vibrator driving signal is amplified by the ink metering control unit 12 to a power necessary for displacing the electrostriction vibrator for modulation, that is the layered piezoelectric element 44 for ink metering, and supplied as the modulation vibrator impression signal to the print head ink metering unit 13.

The modulation vibrator impression signal is fed to the print head ink metering unit 13 for a preset time. Thus, the ink is accurately metered in the print head ink metering unit 13 according to the printing data signal. Subsequently, the modulation vibrator impression signal is invalidated.

On termination of the ink metering, the timing control unit 16 outputs a diluent discharge timing signal responsive to the picture printing data signal to the diluent discharging control unit 15. This diluent discharge timing signal is amplified by the diluent discharging control unit 15 to a level necessary for displacing the electrostriction vibrator for emission, that is, the layered piezoelectric element 34 for emitting the dilution liquid, and sent as a diluent discharge vibrator impression signal to the print head diluent discharging unit 14.

The print head diluent discharging unit 14 mixes and unifies the dilution liquid with the ink metered by the above print head ink metering unit 13 and emits the mixed liquid at the diluent discharge orifice 56. This forms an ink dot of a desired concentration on the recording paper sheet.

If, in the printing picture data signal, the amount of ink emission in one or more print heads 21 (print head A) is set to 000, while the amount of ink emission in another one of the print heads 21 (print head B) is set to a larger value than 000, the emission of the ink in the print head A is stopped. In this case, the stop means 22 is provided to prevent the corresponding dilution liquid from being emitted superfluously.

Thus, in the printing apparatus according to the present invention, the stop means 22 is provided for stopping the emission of the dilution liquid in the print head A if the amount of ink emission in the print head A is not larger than a preset threshold value (e.g., the picture printing data signal is not larger than 002), while the amount of ink emission in the print head B is larger than the preset threshold value (e.g., larger than 002).

The above threshold value is not limited to 002. For example, the threshold value can be set to 000, which would signify a complete cessation of the metered ink emission.

The stop control signal is prepared by the CPU 5 and sent to the stop means 22. If the picture printing signal is such that the amounts of ink emission in the print head A and in the print head B are not larger than the threshold value and not smaller than the threshold value, respectively, the stop means 22 interrupts the sending of the diluent discharge timing signal to the diluent discharging control unit 15 in the print head A such that the emission of the ink and the dilution liquid is terminated.

If the amount of ink emission in the print head 21 is set to a value not larger than the threshold value, the ink concentration is extremely low such that visual inspection reveals no definite picture printing concentration. Therefore, if the dilution liquid is emitted in this case from the print head 21, such dilution liquid would be superfluous.

Thus, if, in the above printer, the amounts of the print head A and B are set to values not larger than and larger than the above threshold value, respectively, the emission of superfluous dilution liquid in the print head A is suppressed by the stop means 22. Therefore, it becomes possible to prevent bleeding or flow of the ink liquid droplets on the recording sheet, while the drying of the ink liquid droplet is accelerated.

Alternatively, the stop means 22 can be connected to the ink metering control unit 12, as well as the discharging control unit 15, as shown in dashed lines in FIGS. 1 and 2. In this case, the stop means 22 can cause the ink metering control unit 12 and the discharging control unit 15 for a respective print head to stop the discharge of ink and dilution liquid, respectively, when the printing data corresponding to a dot to be printed by that print head falls below the preset threshold value.

In this alternate embodiment, the stop means 22 detects the printing data to be inputted into the plurality of print heads 21. The stop means then functions to stop a discharge of the ink and dilution liquid from at least one print head whose printing data corresponding to a dot to be printed is below the preset threshold value, while permitting a discharge of the ink and dilution liquid from another print head whose printing data corresponding to the dot is above the predetermined threshold value If the picture printing data for the print head 21 is 000, the following means can be used.

(1) If, in an all-white area, tone jump or pseudo contour is not outstanding, emission of ink droplets in all print heads (ink and dilution liquid) is terminated.

(2) Alternatively, ink liquid droplets can be emitted from at least one print head. For this print head 21, the print head 21 associated with C (cyan), for example, can be selected.

By emitting the ink liquid droplets from the print head 21 associated with C (cyan), the all-white area associated with the picture printing data 000 is colored only slightly with the cyan color. However, this color is so low in concentration that it cannot be recognized visually. As a matter of fact, if the all-white area having this color is viewed, the white color is accentuated to the viewer, such that, occasionally, an all-white area appears whiter than the background color of the recording paper. At this time, the dynamic range of the printed picture in its entirety is enlarged such that the picture quality looks as if it were improved.

Moreover, since the cyan color is present, generation of tone jump or pseudo contour is suppressed by the emission of the dilution liquid. Thus, it becomes possible to improve the picture printing speed and to effect picture printing of higher quality.

After the first ink dot has been formed as described above on the recording paper sheet, the next ink dot is formed. That is, the picture printing data to be printed next, which is stored in the RAM 7, is sent to the D/A converter 11, and subsequently, the above-described sequence of operations is repeated.

The motor controller 17 then generates a motor driving signal for feeding the recording paper sheet in a timed relation to the driving of the print head based on the motor driving control signal from the CPU 5. This motor driving signal is sent via the motor driving unit 18 to the paper feed motor of the motor unit 19 for feeding the recording paper. By repetition of the above sequence of operations, the operations of paper feed, head feed, voltage impression across the head, and emission are realized.

Figure 6:
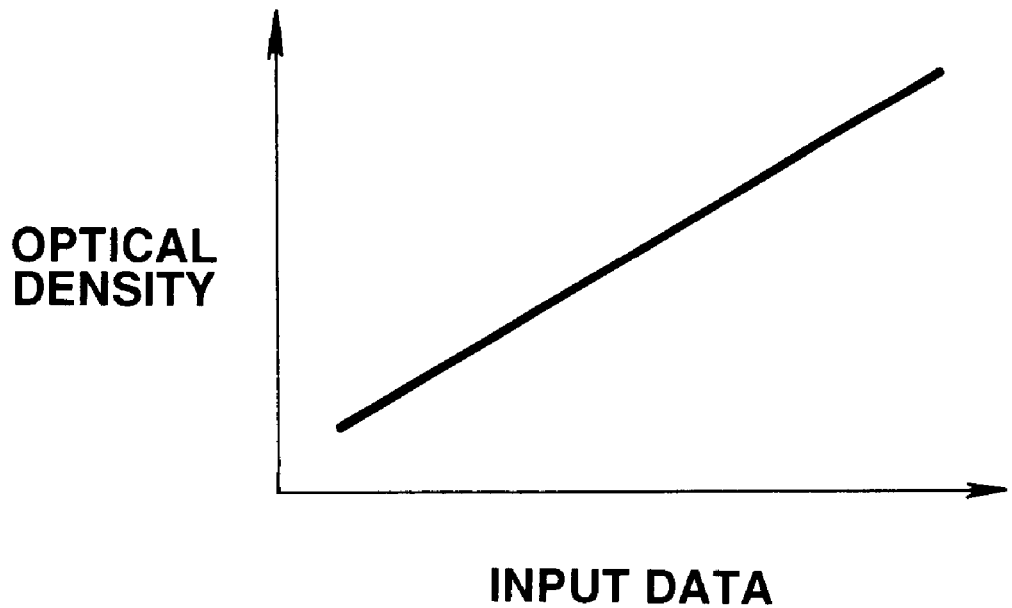
FIG. 6 shows the relationship between the optical density (OD) and the impressed voltage (Input Data) in the print head employing a multiple concentration ink mixing type ink dot concentration modulation method.

In the above printing apparatus, the relation between the impressed voltage (input data) and the optical density (OD) in the print head employing the multiple concentration ink mixing type ink dot concentration modulation method is as shown, for example, in FIG. 6.

Although the amount of displacement of the layered piezoelectric element 44 for ink metering is corrected in the embodiment of FIG. 1, the amount of displacement of the layered piezoelectric element 34 for diluent discharge may be corrected simultaneously.

Figure 7:
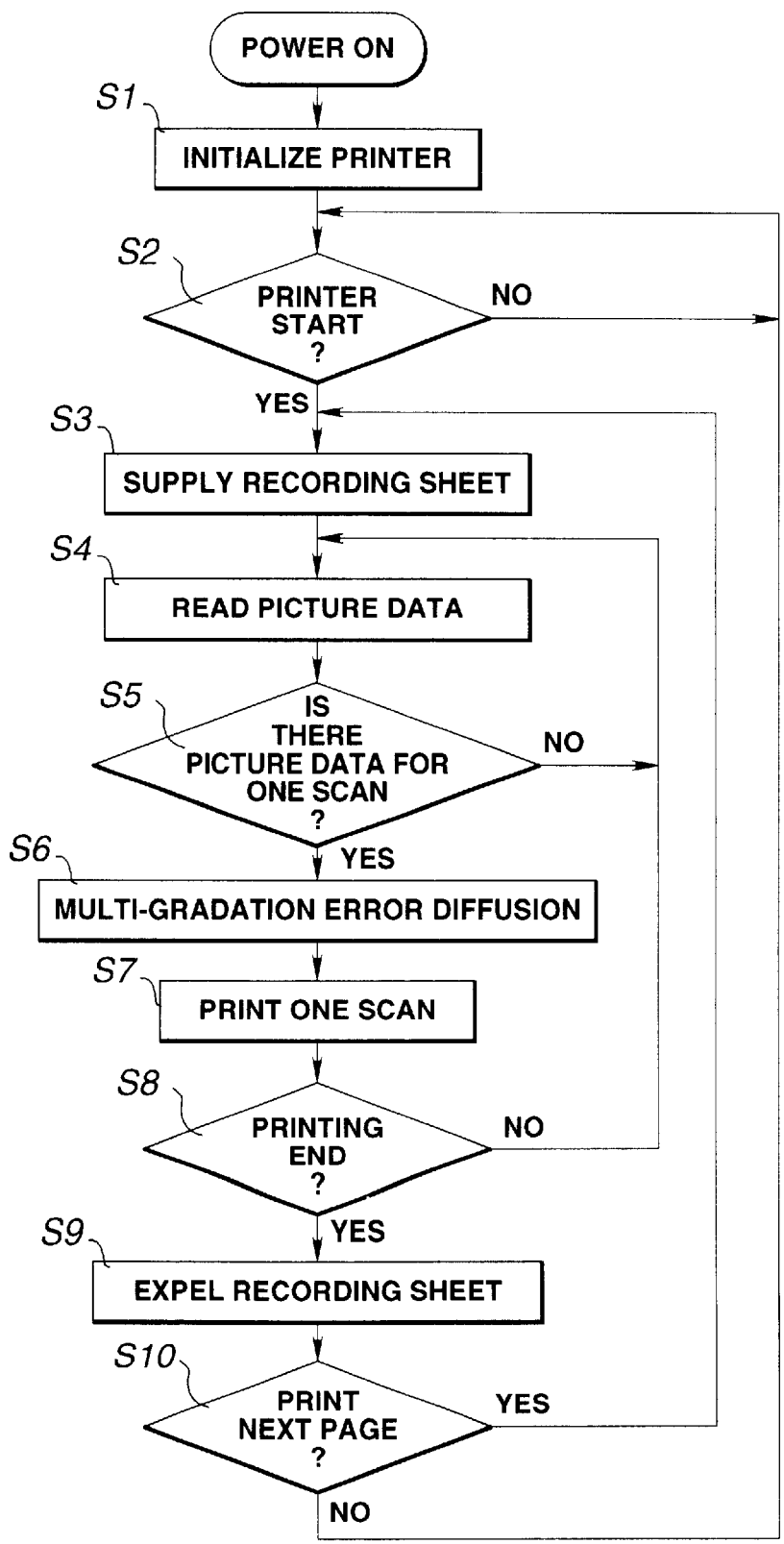
FIG. 7 is a flow chart for illustrating a dithering control operation.

The processing flow of the printing operation in the printing apparatus of FIG. 1 is as shown in the flow chart of FIG. 7.

That is, on power-up of the printing apparatus in FIG. 7, the printing apparatus is initialized at step S1. At the next step S2, it is checked whether or not the printing start request command signal has been supplied. If the printing start request command signal has not been supplied at the step S2, the judgment of step S2 is repeated. If the printing start request command signal has been supplied, processing transfers to step S3.

At this step S3, the paper feed operation of feeding the recording paper sheet to the printing start position is carried out. At the next step S4, picture data from the data input interfacing unit 4 is read before processing transfers to step S5. At this step S5, it is checked whether or not one scan of the picture data has been read and, if not, the process reverts to step S4. If it is determined that there is sufficient picture data for one scan, processing transfers to step S6.

At step S6, the corrected picture data is processed by, for example, the multiple gradation error diffusion method, as described above, for generating the picture data to be printed.

At the next step S7, one-scan printing employing one-scan picture printing data processed with the multiple gradation error diffusion method is printed. At step S8, it is checked whether or not printing has come to a close. If the printing has not come to a close, processing reverts to step S4 and, if otherwise, processing transfers to step S9. The recording paper sheet is discharged at this step S9 and, at the next step S10, it is judged whether or not the next page is to be printed. If, at the step S10, the next page is to be printed, processing reverts to step S3. If otherwise, the processing reverts to step S2.

Figure 8:
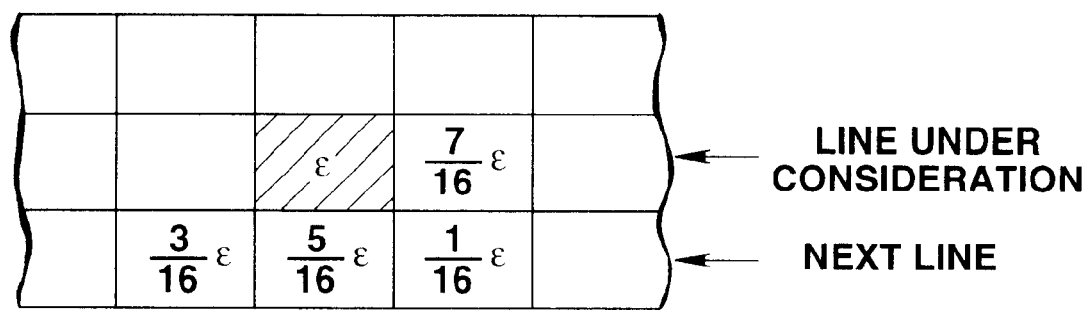
FIG. 8 is a pixel diagram which illustrates an error diffusion method.

The multiple gradation error diffusion method is explained by referring to FIG. 8.

With reference to a pixel G of a line under consideration, the input level x of picture data to be inherently printed, and the level that can be actually assumed at the time of actual printing, are related by the following equation (1):

$$\epsilon = x - x \!\!\!/\!\!\!E \qquad (1)$$

That is, the input level x is the input picture data itself, which has 256 gradations, while there are only several levels $x\!\!\!/\!\!\!E$ that can be assumed during actual printing. Therefore, there is an error $\epsilon$ between the input level x and the actual level $x\!\!\!/\!\!\!E$.

For conversion from the input picture data level x to the actual level $x\!\!\!/\!\!\!E$, conversion employing one of the following two conversion methods becomes necessary.

With the first conversion method, the level x of the input picture data is replaced by the level closest to it.

The second conversion method is a technique of replacing the absolute value between the plural levels that can be assumed by the level $x\!\!\!/\!\!\!E$ and the input level x. That is, with the second conversion method, a value closest to the level x of the input picture data is converted as a value having the highest probability, while the value remotest from the level x is converted as having the lowest probability. If the second conversion method is used, there is a probability that the level $x\!\!\!/\!\!\!E$ will be replaced by all levels of the plural possible stages.

The error $\epsilon$ thus found is distributed to pixels around the pixel G. Various different ratios and surrounding pixels are possible. FIG. 8 shows only one such example. One of the following two methods of distribution may be used.

As the first distribution method, the ratios of distribution, as set for pixels around the pixel G, are multiplied by the error ϵ, and the resulting product values are summed to the input levels of the surrounding pixels to be in use.

As the second method of distribution, the error ϵ is summed to the input levels of the surrounding pixels to be in use with the probability of the respective distribution ratios set for the respective pixels around the pixel G.

The distribution ratios, such as 7/26, 3/16, 5/16, and 1/16, are multiplied to the error ϵ depending on the positions of the pixels around the pixel under consideration G.

Also, one of the following two methods may be used for coping with the situation in which the minimum picture printing level or the maximum picture printing level are exceeded as a result of the addition of the errors of the surrounding pixels of the pixel under consideration. With the first method, the portion exceeding the minimum picture printing level or the maximum picture printing level is disregarded (rounded). With the second method, the portion exceeding the minimum picture printing level or the maximum picture level are reallocated in accordance with the above ratios or probability values.

With the present embodiment, the entire input picture is processed as described above for producing picture printing data to be printed.

The method of combining the ink dot density modulation method and the dither method as the error diffusion method will now be explained.

For expressing a given half-tone, one of the following three half-tone expressing methods may be used. One of these methods most appropriate is selected automatically or manually (by, for example, a key connected to the CPU 5) in keeping with the pattern to be printed.

With the first half-tone expressing method, the ink dot density is set to a size suited to the half-tone. With the second half-tone expressing method, the ink dot density is set to a size one to two stages smaller than the size suited for the half-tone, and the portion in shortage is eked out by arraying small ink dots around the surrounding pixels for comprehensively expressing the half-tone. With the third half-tone expressing method, a large number of low density ink dots are arrayed in a peripheral area for comprehensively expressing the half-tone.

The picture is lowered in effective resolution in a direction proceeding from the first half-tone expressing method through the second half-tone expressing method to the third half-tone expressing method. Conversely, the graininess, which the high ink dot density gives the picture, is lowered.

Consequently, for a picture for which high graininess is desirable at the cost of the effective resolution, such as a portrait, the second half-tone expressing method is preferred to the first half-tone expressing method for picture printing, while the third half-tone expressing method is preferred to the second half-tone expressing method for picture printing.

Conversely, for a picture for which high effective resolution is desirable at the cost of the graininess, such as a design drawing, the first half-tone expressing method is preferred to the second or third half-tone expressing methods for picture printing. For a picture for which both effective resolution and graininess are desired, the second half-tone expressing method is desirable. If, within a single picture for printing, the effective resolution and graininess required of partial pictures can be measured, the first to third half-tone expressing methods can be switched automatically.

Figure 9:
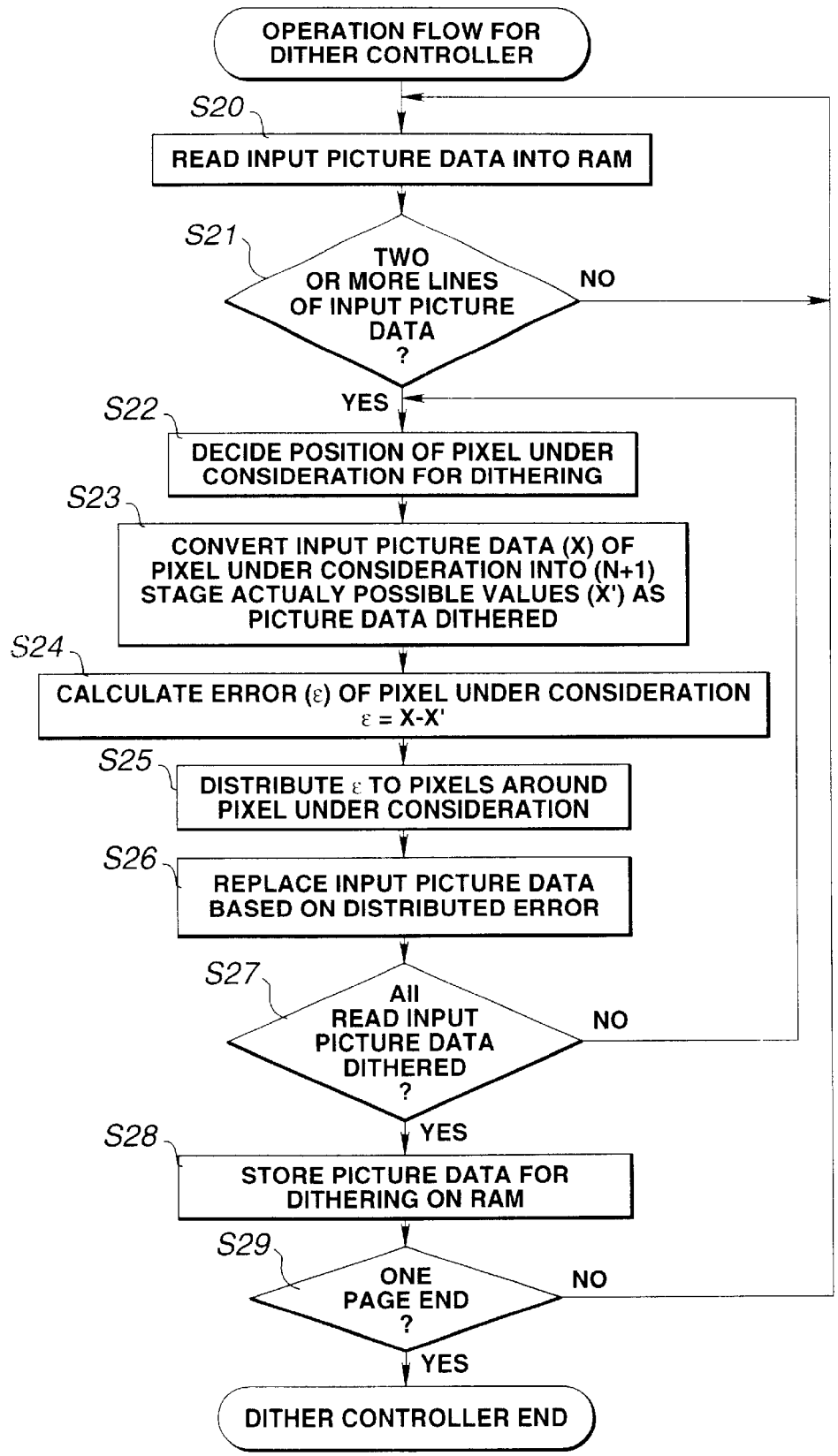
FIG. 9 is a flow chart for further illustrating a dithering control operation.

The operational control by the CPU 5 when the dither method is used in combination with the above-described multiple gradation error diffusion method will now be explained. FIG. 9 shows a flow chart for such operational control. It is assumed that, in the explanation of FIG. 9, the print head can assume different values of N stages of the ink dot density.

Referring to FIG. 9, input picture data is entered at step S20 to the RAM 7. Then, at step S21, it is checked whether or not two or more lines of the input picture data have been stored in the RAM 7. If it is found at step S21 that two or more lines have not been stored, processing reverts to step S20 and, if otherwise, processing transfers to step S22.

At step S22, the pixel under consideration for application of the dither method (pixel G of FIG. 8) is determined. At the next step S23, the input picture data (level x) of the picture under consideration, thus determined, is converted to (n+1) actually possible values (level xÆ) to form dithered picture data. The above-mentioned first or second conversion method may be used for conversion from the level x to the level xÆ.

That is, in the first conversion method, conversion is made to the level xÆ closest to the level x of the input picture data. In the second conversion method, the value closest to the level x of the input picture data is used for conversion as having the highest probability, while the value remotest from the level x of the input picture data is used for conversion as having the lowest probability.

At the next step S24, the error ϵ of the pixel under consideration is computed. The error ϵ is found using the above equation (1). At the next step S25, the error ϵ is distributed to the pixels around the pixel under consideration. That is, with the first distribution method, at the step S25 the error e is distributed to the pixels around the pixel under consideration, whereas, with the first distribution method the error ϵ is reflected with probability to the pixels around the pixel under consideration.

At the next step S26, the input picture data around the pixel under consideration is replaced on the basis of the error distributed ϵ. If, at step S26, the minimum picture printing level or the maximum picture printing level is exceeded at step S26 as a result of the addition of the errors of the surrounding pixels, the portion exceeding the minimum or maximum picture printing level is rounded, as with the first method. The rounded portion is disregarded. Alternatively, the rounded portion is reallocated to the surrounding pixels, as with the first method.

It is then judged, at step S27, whether the input picture data read into the RAM 7 in the step S27 have all been dithered. If it is found that the input picture data have not all been dithered, processing reverts to step S22 and, if otherwise, processing transfers to step S28. At the step S28, the dithered picture data is stored in a separate location on the RAM 7. At the next step S29, it is checked whether or not the above processing for one-page picture data has come to a close. If it is found that processing has not come to a close at step S29, processing reverts to step S20 and, if otherwise, processing for dithering is terminated.

Figure 10:
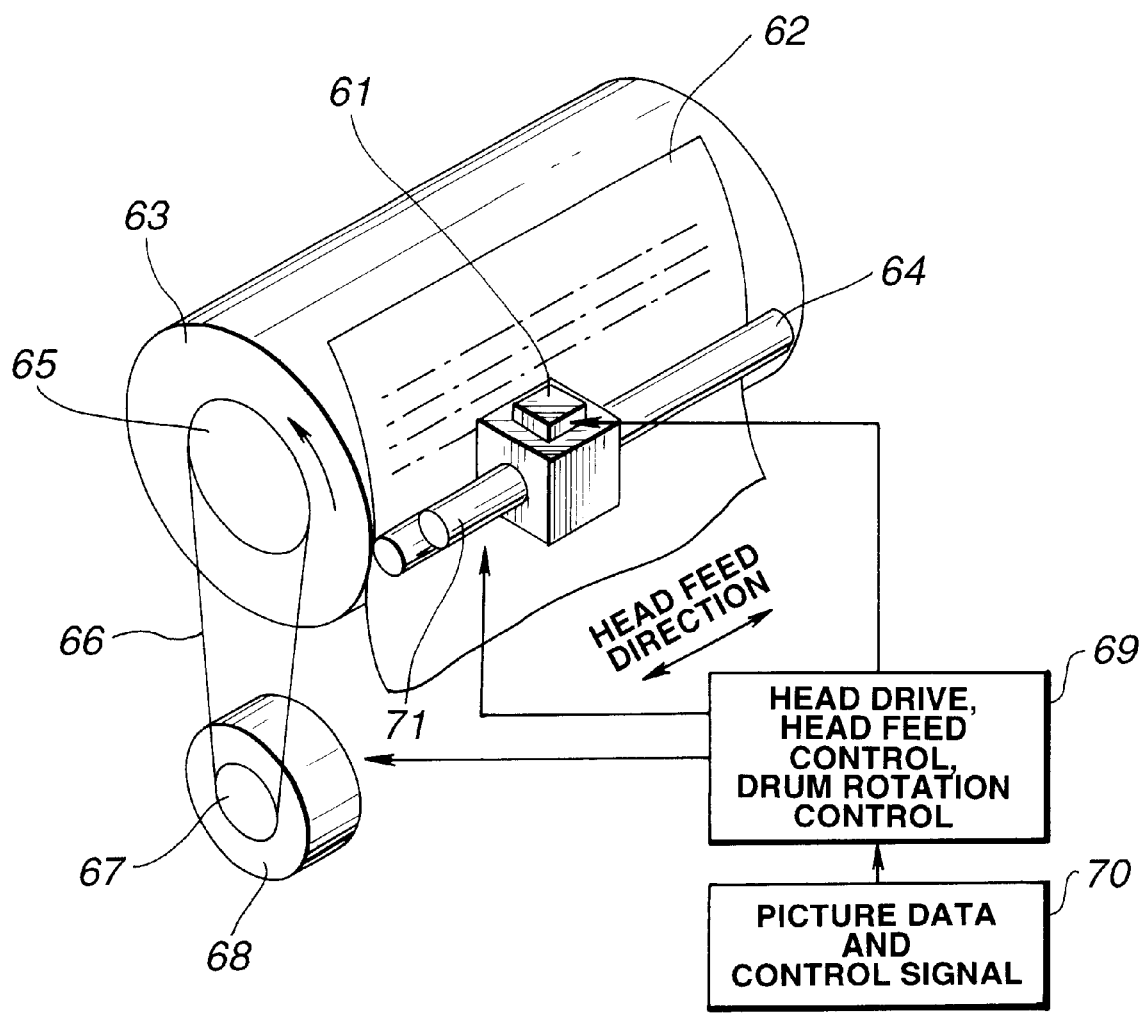
FIG. 10 shows the overall structure of a serial-type ink jet printing apparatus.
Figure 11:
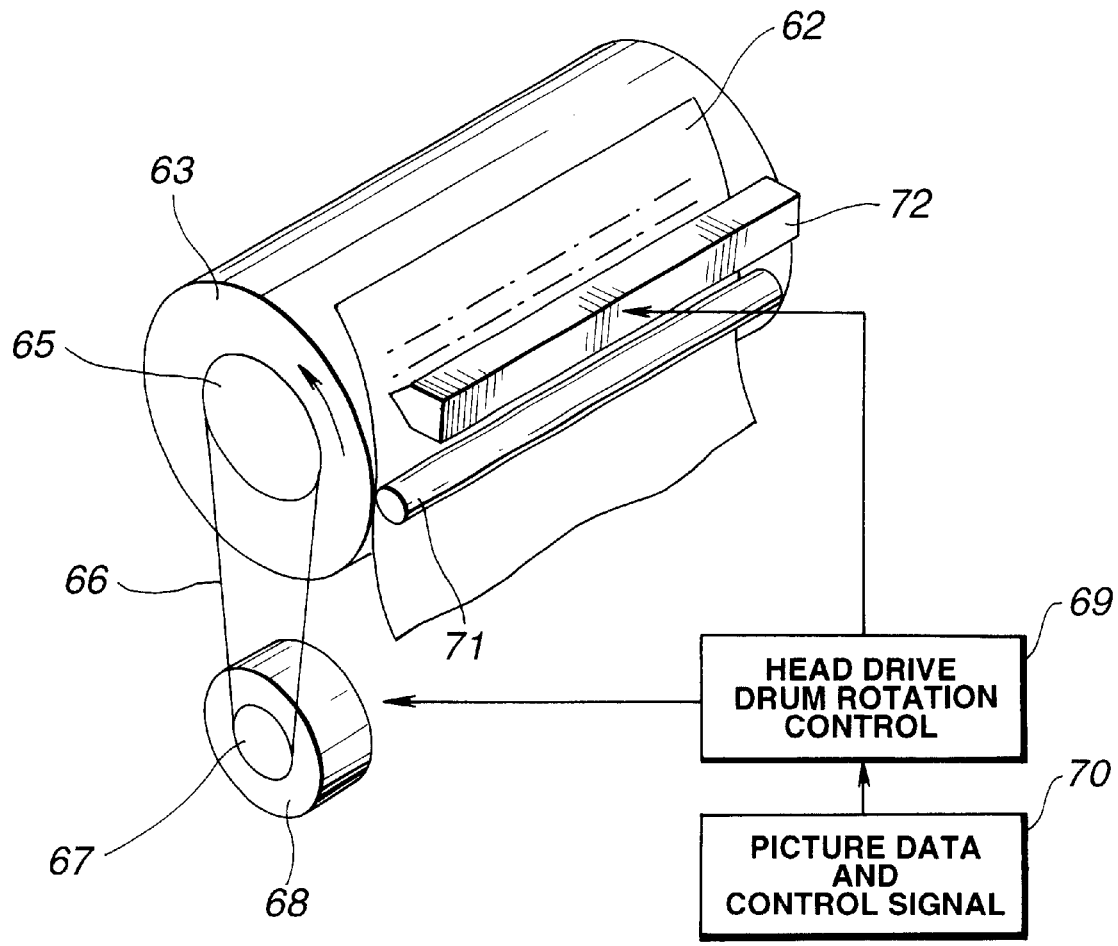
FIG. 11 shows the overall structure of a line-type ink jet printing apparatus.

Referring to FIGS. 10 and 11, the construction of the actual driving portions of the above printing apparatus is explained.

FIG. 10 shows the structure of a so-called serial type printing apparatus as an example of the head driving type printer. In FIG. 10, a printing paper sheet 62, as a printing support, is kept in pressure contact with a drum 63 by a paper pressuring roll 71 provided parallel to the axis of the drum 63.

A feed screw 64 is mounted parallel to the drum axis and a print head 61 is held by the feed screw 64. Rotation of the feed screw 64 shifts a print head portion 61 in the axial direction. The print head portion 61 carries print heads 21 for various colors side-by-side.

The drum 63 is run in rotation by a motor 68 via a pulley 65, a belt 66, and a pulley 67. The rotation of a feed screw 64 and the motor 68 and the driving of the print head 61 are controlled by a driving controller 69, which is controlled on the basis of picture printing data and a control signal from a control signal generator 70.

In the above structure, if the print head 61 is moved to effect one-line picture printing, the drum 63 is rotated one line for printing the next row. The print head 61 is moved unidirectionally or in reciprocating directions.

FIG. 11 shows an illustrative structure of a driving portion of the line-type printing apparatus. In FIG. 11, the component elements identical with those of FIG. 10 are denoted by the same reference numerals and the corresponding description is omitted for clarity.

In FIG. 11, a line head 72 having a large number of print heads in a line configuration in place of the serial type head and the feed screw, as shown in FIG. 10, is fixedly mounted in the axial direction. A large number of sets of the print heads associated with the respective colors are mounted side-by-side in the print head 72, and a dot for one pixel is formed by each set.

With the above construction, one-row picture printing is performed simultaneously by the line head 72. After the end of printing, the drum 63 is rotated by one row for picture printing the next row. It is also possible to print the entire line collectively, to split data into plural blocks, or to print every other row.

With the printing apparatus of the present invention, the emission of any superfluous dilution liquid may be suppressed to suppress generation of the jump or pseudo contour to improve printing speed and to achieve quality picture printing.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A printing apparatus comprising:
    a plurality of print heads for printing a plurality of respective colors based on printing data, each print head of said plurality of print heads having an element for discharging an ink and an element for discharging a dilution liquid; and
    a stop means for stopping a discharge of said dilution liquid from a first print head of said plurality of print heads when the printing data corresponding to a dot to be printed by said first print head is not above a preset threshold value while the printing data corresponding to a dot to be printed by a second print head of said plurality of print heads is above said preset threshold value.

2. The printing apparatus according to claim 1, wherein said plurality of print heads includes respective print heads for printing colors of cyan, magenta, yellow, and black.

3. The printing apparatus of claim 2, wherein said print head for printing cyan includes cyan when printing an all-white area so that the resulting all-white area appears whiter than the background color of the recording paper, thereby improving the dynamic range of the printed picture.

4. The printing apparatus according to claim 1, wherein said preset threshold value is approximately 002 when said printing data has 256 color gradations, with a value of 000 corresponding to a lowest ink concentration and a value of 255 corresponding to a highest ink concentration.

5. The printing apparatus according to claim 1, wherein said printing data is prepared using a multigradation error diffusion method.

6. The printing apparatus according to claim 1, wherein said stop means provides a means for stopping a discharge of said ink from said first print head at the same time as a discharge of dilution liquid from said first print head is stopped.

7. The printing apparatus according to claim 1, wherein said stop means detects said printing data to be inputted into said plurality of print heads.

8. The printing apparatus as claimed in claim 1, wherein
    said element for discharging an ink is a first piezoelectric element; and
    said element for discharging a dilution liquid is a second piezoelectric element.

9. The printing apparatus as claimed in claim 1, wherein one of said print heads discharges a mixture of said ink and dilution liquid after a piezoelectric element oozes said ink from an ink nozzle adjacent a dilution liquid nozzle.

10. The printing apparatus of claims 1 or 9, further comprising:
    said piezoelectric element being made from one of lead titanate zirconate ($PbiO_3$), barium titanate ($BaTiO_3$), quartz and Rochel salts.

11. The printing apparatus of claims 1 or 7, further comprising:
    said plurality of print heads having an integrated circuit loaded on the print head itself for reducing the number of electrical interconnections.

12. The printing apparatus of claim 1, further comprising:
    said each print head of said plurality of print heads having a first supply chamber in fluid communication with a diluent discharge side cavity and a second supply chamber in fluid communication with a ink metering side cavity, wherein said diluent discharge side cavity and said ink metering side cavity are hermetically sealed by an orifice plate and a laminated vibration plate.

13. The printing apparatus of claim 12, wherein:
    said orifice and vibration plates are formed from a metal such as nickel, and said cavities are formed using a photosensitive resin such as a dry film photoresist.

14. A method of driving a printing apparatus having a plurality of print heads for printing a plurality of respective colors based on printing data, each print head of said print heads having an element for discharging an ink and an element for discharging a dilution liquid, the method comprising the steps of:
    receiving said printing data from a CPU system bus, said printing data determining an ink concentration for a dot to be printed;
    comparing said printing data to a preset threshold value;
    stopping a discharge of said dilution liquid from a first print head of said plurality of print heads when said printing data corresponding to a dot to be printed by said first print head is not above a preset threshold value while said printing data corresponding to a dot to be printed by a second print head of said plurality of print heads is above said preset threshold value.

15. The method of driving a printing apparatus according to claim 14, further comprising the step of producing said printing data using a multigradation error diffusion method.

16. The driving method of claim 15, wherein said multigradation error diffusion method further comprises:

determining the gradation to be applied across said element for discharging said ink according to instability factors including hysteresis, variations in head assembly, emission characteristics of the vibration plate, and changes in ink-dot concentration.

17. The method of driving a printing apparatus according to claim 14, wherein said plurality of print heads includes respective print heads for printing colors of cyan, magenta, yellow, and black.

18. The method of driving a printing apparatus according to claim 14, further comprising the step of stopping a discharge of ink from said first print head at the same time as stopping a discharge of dilution liquid from said first print head.

19. The method of driving a printing apparatus according to claim 14, further comprising:

separately discharging ink and dilution liquid from at least another one of said print heads whose printing data corresponding to said dot to be printed is greater than said predetermined threshold value;

interrupting the sending of a diluent discharge timing signal to a diluent discharging control unit in said first print head to terminate the emission of said ink and said dilution liquid according to said predetermined threshold value; and preventing superfluous emission of dilution liquid.

20. The method of driving a printing apparatus according to claim 19, wherein the ink of said at least another one of said print heads is cyan.

21. The driving method of claim 20, further comprising:

printing an all-white area by including cyan so that the resulting all-white area appears whiter than the background color of the recording paper, thereby reducing tone jump or pseudo contour and improving the dynamic range of the printed picture.

22. The method of driving a printing apparatus according to claim 19, wherein after said step of separately discharging ink and dilution liquid from said one of said print heads, said method further comprising:

oozing said ink from an ink nozzle toward an adjacent dilution liquid nozzle, thereby combining said ink and dilution liquid, resulting in discharging a mixture of said ink and dilution liquid from said print head.

23. The method of driving a printing apparatus according to claim 19, wherein said plurality of print heads includes respective print heads for printing colors of cyan, magenta, yellow, and black.

24. The method of driving a printing apparatus according to claim 14, wherein said element for discharging an ink is a first piezoelectric element; and said element for discharging a dilution liquid is a second piezoelectric element.

25. The driving method of claim 14, wherein said step of separately discharging further comprises:

before printing, maintaining a voltage across said piezoelectric element at a first level;

reducing said first voltage level to a second voltage level for a predetermined time interval;

causing ink to ooze out of an ink nozzle of said print head toward an orifice;

returning said voltage to said first level, thereby oozing only a desired quantity of ink from said nozzle;

reducing said voltage to zero;

discharging diluent from a diluent nozzle of said print head;

mixing of said ink and diluent;

increasing said voltage to a third highest level;

discharging said ink and diluent mixture onto a printing paper; and restoring said voltage to said first level.

* * * * *